(12) United States Patent
Seo et al.

(10) Patent No.: US 11,915,627 B2
(45) Date of Patent: Feb. 27, 2024

(54) THREE-DIMENSIONAL HOLOGRAPHIC DISPLAY USING MULTIPLE PINHOLES AND METHOD OF OPERATING THE SAME

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Wontaek Seo, Yongin-si (KR); Yongkeun Park, Daejeon (KR); Hoon Song, Yongin-si (KR); Jungkwuen An, Suwon-si (KR); Jongchan Park, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 451 days.

(21) Appl. No.: 16/579,231

(22) Filed: Sep. 23, 2019

(65) Prior Publication Data

US 2020/0273388 A1 Aug. 27, 2020

(30) Foreign Application Priority Data

Feb. 26, 2019 (KR) .................... 10-2019-0022578

(51) Int. Cl.
*G09G 3/00* (2006.01)
*G01S 3/787* (2006.01)
(Continued)

(52) U.S. Cl.
CPC ............. *G09G 3/003* (2013.01); *G01S 3/787* (2013.01); *G02B 30/27* (2020.01); *H04N 13/351* (2018.05); *H04N 13/282* (2018.05)

(58) Field of Classification Search
CPC ..... G01S 3/787; G02B 27/0081; G02B 30/26; G02B 30/27; G02B 5/32; G03H 1/2205;
(Continued)

(56) References Cited

U.S. PATENT DOCUMENTS

| 6,798,390 B1 * | 9/2004 | Sudo ................... H04N 13/211 345/7 |
| 9,354,605 B2 | 5/2016 | Park et al. |

(Continued)

FOREIGN PATENT DOCUMENTS

| CN | 207037243 U | 2/2018 |
| JP | 11-174377 A | 7/1999 |

(Continued)

OTHER PUBLICATIONS

Yaras, Fahri et al., "State of the Art in Holographic Displays: A Survey", Journal of Display Technology, vol. 6, No. 10, Oct. 2010, pp. 443-454. (12 pages total).

(Continued)

*Primary Examiner* — Ram A Mistry
(74) *Attorney, Agent, or Firm* — Sughrue Mion, PLLC

(57) ABSTRACT

A viewing angle expansion plate, which is a multi-pinhole mask, includes a plurality of cell areas; and a plurality of pinholes formed in the plurality of cell areas, wherein each cell area from among the plurality of cell areas corresponds to a respective pixel from among a plurality of pixels in a flat panel display. The flat panel display includes a light source configured to emit parallel light; a flat panel, on which the parallel light is incident, configured to provide a three-dimensional image; and the viewing angle expansion plate.

19 Claims, 16 Drawing Sheets

(51) Int. Cl.
*H04N 13/351* (2018.01)
*G02B 30/27* (2020.01)
*H04N 13/282* (2018.01)

(58) Field of Classification Search
CPC .. G03H 1/2294; G03H 1/32; G03H 2001/221;
G03H 2001/2239; G03H 2223/12; G03H
2223/14; G03H 2225/55; H04N 13/282;
H04N 13/351; G09G 3/003
See application file for complete search history.

(56) References Cited

U.S. PATENT DOCUMENTS

| | | | |
|---|---|---|---|
| 2009/0032827 A1* | 2/2009 | Smits | H01L 33/54 257/89 |
| 2010/0328433 A1* | 12/2010 | Li | G03H 1/0808 348/51 |
| 2012/0062565 A1* | 3/2012 | Fuchs | H04N 13/31 345/419 |
| 2013/0215484 A1 | 8/2013 | Takaki et al. | |
| 2016/0349702 A1 | 12/2016 | Sung et al. | |
| 2017/0185037 A1* | 6/2017 | Lee | G03H 1/2286 |
| 2018/0045860 A1 | 2/2018 | Kawanishi et al. | |
| 2018/0129166 A1 | 5/2018 | Seo et al. | |
| 2018/0166616 A1* | 6/2018 | White | H01L 25/0655 |
| 2018/0252935 A1 | 9/2018 | Vertegaal et al. | |
| 2018/0364641 A1 | 12/2018 | Park et al. | |

FOREIGN PATENT DOCUMENTS

| | | |
|---|---|---|
| JP | 11-194702 A | 7/1999 |
| JP | 5970631 B2 | 8/2016 |
| KR | 10-1292370 B1 | 8/2013 |
| KR | 10-2018-0052357 A | 5/2018 |
| KR | 10-2018-0118942 A | 11/2018 |
| KR | 10-2018-0138111 A | 12/2018 |
| WO | 2006/078537 A2 | 7/2006 |
| WO | 2016/132643 A1 | 8/2016 |

OTHER PUBLICATIONS

Sivankutty, Siddharth et al., "Extended field-of-view in a lensless endoscope using an aperiodic multicore fiber", arXiv:1606.08169v1, [physics.optics], Jun. 27, 2016. (12 pages total).

Anonymous, "Diffuser Selection Guide", Edmund Optics, https://www.edmundoptics.com/resources/application-notes/optics/diffuser-selection-guide/, retrieved from the internet Nov. 15, 2019. (5 pages total).

Communication dated Nov. 20, 2023 by the Korean Intellectual Property Office for Korean Patent Application No. 10-2019-0022578.

* cited by examiner

THREE-DIMENSIONAL HOLOGRAPHIC DISPLAY USING MULTIPLE PINHOLES AND METHOD OF OPERATING THE SAME

CROSS-REFERENCE TO RELATED APPLICATION

This application is based on and claims priority under 35 U.S.C. § 119 to Korean Patent Application No. 10-19-0022578, filed on Feb. 26, 2019, in the Korean Intellectual Property Office, the disclosure of which is incorporated by reference herein in its entirety.

BACKGROUND

1. Field

The disclosure relates to a viewing angle expansion plate, a flat panel display including the same, and a method of operating the flat panel display, and more particularly, to a three-dimensional holographic display using multiple pinholes and a method of operating the same.

2. Description of Related Art

A holographic display may provide accurate depth information to viewers to provide a high-quality 3D experience.

A three-dimensional (3D) holographic imaging technique is a technique of directly generating a wavefront of light having 3D image information. Unlike a technique of expressing different image information in each eye using the parallax effect, the holographic technique restores light information from an actual object as it is. Therefore, the conventional 3D holographic imaging technique enables viewers to see 3D images with depth information without special glasses.

In the conventional 3D holographic imaging technique, a spatial light modulator is used to modulate light to have 3D image information. In this case, the sizes of the 3D images and the size of a viewing angle enabling viewing of the 3D images are limited by the number of optical modes that the spatial light modulator can control.

SUMMARY

A viewing angle expansion plate (e.g., a multi-pinhole mask) is provided which, when applied to a display, may increase a viewing angle without losing an image size while maintaining the image size.

A view angle expansion plate is provided which may increase transmittance.

A flat panel display is provided that includes the viewing angle expansion plate.

A method of operating the flat panel display is provided.

Additional aspects will be set forth in part in the description which follows and, in part, will be apparent from the description, or may be learned by practice of the presented embodiments.

In accordance with an aspect of the disclosure, a viewing angle expansion plate includes a plurality of cell areas; and a plurality of pinholes formed in the plurality of cell areas, wherein each cell area from among the plurality of cell areas corresponds to a respective pixel from among a plurality of pixels in a flat panel display.

The plurality of pinholes may be randomly distributed throughout the plurality of cell areas.

Each cell area from among the plurality of cell areas may include at least one pinhole from among the plurality of pinholes.

A first distribution of pinholes formed in a first cell area from among the plurality of cell areas may be the same as a second distribution of pinholes formed in a second cell area from among the plurality of cell areas.

The plurality of pinholes may be randomly distributed in a group of cell areas from among the plurality of cell areas, and the plurality of pinholes may be distributed in a repeating pattern in the remaining cell areas from among the plurality of cell areas.

The plurality of pinholes may be distributed in a basic hole distribution pattern.

Each cell area from among the plurality of cell areas may include a respective group of pinholes from among the plurality of pinholes, and a predetermined number of pinholes from among the group of pinholes may be positioned at a predetermined distance from a center of the respective cell area.

Each cell area from among the plurality of cell areas may include a plurality of groups of pinholes from among the plurality of pinholes, for each group of pinholes from among the plurality of groups of pinholes, each pinhole belonging to the respective group of pinholes may be positioned at a respective distance from a center of the respective cell area, the respective distance from the center of the respective cell area may be different for each group of pinholes, and a number of pinholes belonging to each group of pinholes may follow a normal distribution with respect to the respective distance from the center of the respective cell area.

Each cell area from among the plurality of cell areas may include only one respective pinhole, and a distance between a center of a respective cell area from among the plurality of cell areas and the respective pinhole may be different for each cell area.

In accordance with an aspect of the disclosure, a flat panel display includes a light source configured to emit parallel light; a flat panel, on which the parallel light is incident, configured to provide a three-dimensional image; and a viewing angle expansion plate in accordance with an above-noted aspect of the disclosure configured to expand a viewing angle of the three-dimensional image.

The flat panel may include a liquid crystal display (LCD) panel configured to provide a holographic image.

The light source may include a meta lens.

The light source may include a lens comprising a turbid medium.

In accordance with an aspect of the disclosure, a flat panel display includes a light source configured to emit parallel light; a flat panel on which the parallel light is incident, the flat panel being configured to provide a three-dimensional image; and a viewing angle expansion plate configured to expand a viewing angle of the three-dimensional image, wherein the viewing angle expansion plate includes an optical diffuser.

The optical diffuser may include a ground glass or a semi-transmission film.

In accordance with an aspect of the disclosure, a method of operating a flat panel display is provided, the flat panel display including a light source configured to emit parallel light; a flat panel on which the parallel light is incident, the flat panel being configured to provide a three-dimensional image; and a viewing angle expansion plate in accordance with an above-noted aspect of the disclosure configured to expand a viewing angle of the three-dimensional image, the method including moving the viewing angle expansion plate during operation of the flat panel display.

The moving of the viewing angle expansion plate may include translating the viewing angle expansion plate in a plane parallel to the flat panel.

The viewing angle expansion plate may be tilted relative to the flat panel.

The moving of the viewing angle expansion plate may include rotating the viewing angle expansion plate relative to the flat panel.

The moving of the viewing angle expansion plate may include expanding the viewing angle expansion plate.

The method may further include contracting the expanded viewing angle expansion plate to restore an original viewing angle expansion plate.

The viewing angle expansion plate may include a circular plate or a rectangular plate covering an entire surface of the flat panel on which an image is displayed.

In accordance with an aspect of the disclosure, a method of operating a flat panel display is provided, the flat panel display including a light source configured to emit parallel light; a flat panel on which the parallel light is incident, the flat panel being configured to provide a three-dimensional image; and a viewing angle expansion plate configured to expand a viewing angle of the three-dimensional image, the viewing angle expansion plate including an optical diffuser, the method including moving the optical diffuser during operation of the flat panel display.

The optical diffuser may include a ground glass or a semi-transmission film.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, viewing angle expansion plates, flat panel displays including the viewing angle expansion plate, and methods of operating the flat panel display according to various embodiments will be described in detail with reference to the accompanying drawings. The width and thickness of layers or elements illustrated in the accompanying drawings may be somewhat exaggerated for clarity of description. The method of operating the flat panel display will be described together with description of the flat panel display.

Figure 1:
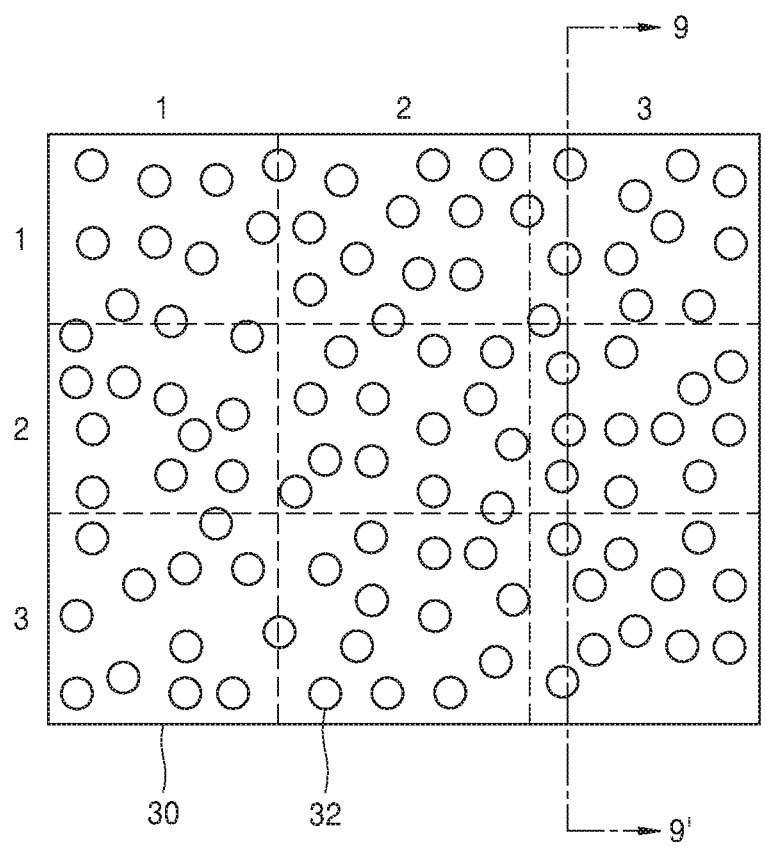
FIG. 1 is a front view of a first pinhole mask according to an embodiment.

FIG. 1 is a front view of a first pinhole mask according to an embodiment. In FIG. 1, horizontal direction numbers 1, 2, and 3 indicate column numbers of a first pinhole mask 30, and vertical direction numbers 1, 2, and 3 indicate row numbers of the first pinhole mask 30. The first pinhole mask 30 includes nine cell areas (1, 1) to (1, 3), (2, 1) to (2, 3), and (3, 1) to (3, 3) designated by these rows and columns. Each of the cell areas (1, 1) to (1, 3), (2, 1) to (2, 3), and (3, 1) to (3, 3) may correspond to a pixel of the flat panel display to which the first pinhole mask 30 is applied. Although the first pinhole mask 30 is limited to include nine cell areas, the number of cell areas may be nine or more. As an example, the first pinhole mask 30 and other pinhole masks described later below may include the same number of cell areas as the number of pixels of a device to which the pinhole mask is applied, such as the flat panel display. The first pinhole mask 30 and other pinhole masks described later below may include a first material having elasticity. In an embodiment, the first pinhole mask 30 and other pinhole masks described later below may include a second material having no elasticity. The first material may include, but is not limited to, a piezoelectric material, a high thermal expansion coefficient material, or a high Young's modulus material. The piezoelectric material may include, but is not limited to, for example, quartz, PZT $(Pb(Zr_xTi_{x-1})O_3)$ $(0 \leq X \leq 1)$, or lithium niobium oxide (e.g., $LiNbO_3$). The high thermal expansion coefficient material may include, but is not limited to, for example, polypropylene, polyvinyl chloride (PVC), aluminum, or copper. The high Young's modulus material may include, but is not limited to, for example, polystyrene or rubber. The second material may include, but is not limited to, coated glass, metal, or film. The first pinhole mask 30 and other pinhole masks described later below may be replaced with another member capable of performing an equivalent function. As an example, a plate including a turbid medium or a plate formed of the turbid medium may be used instead of the first pinhole mask 30. In an embodiment, an optical diffuser, which exhibits a function that is equivalent or similar to the first pinhole mask 30, may be used in place of the first pinhole mask 30. Alternatively, a viewing angle expansion plate including the optical diffuser may be used in place of the first pinhole mask 30. The optical diffuser may spread the incident light to broaden the range of illumination and diffuse the incident light evenly in a specific direction. As an example, the optical diffuser may be a ground glass or a semi-transmission film, or may include such a member. The semi-transmission film may include granules of different sizes.

In FIG. 1, each cell area may not have a physically distinct boundary line. In FIG. 1, the boundaries between the cell areas are indicated by dashed lines for convenience for identification. Each of the nine cell areas (1, 1) to (1, 3), (2, 1) to (2, 3), and (3, 1) to (3, 3) includes a plurality of holes 32. The number of holes 32 formed in the nine cell areas (1, 1) to (1, 3), (2, 1) to (2, 3), and (3, 1) to (3, 3) may be the same or different for each cell area, and each of the nine cell areas may include at least one pinhole. As an example, the number of holes 32 formed in each cell area may increase or decrease from the first cell area (1, 1) to the ninth cell area (3, 3). The arrangement of the plurality of holes 32 may be different for each cell area when the number of holes 32 formed in each cell area is the same or different for each cell area. That is, the arrangement of the holes 32 in the nine cell areas (1, 1) to (1, 3), (2, 1) to (2, 3), and (3, 1) to (3, 3) may all be different. Positions where the plurality of holes 32 are formed in the first pinhole mask 30 are random. Since the first pinhole mask 30 may be applied to a flat panel display, e.g., a holographic display, which displays a three-dimensional image, the plurality of holes 32 may be distributed so that an aliasing effect does not appear on the three-dimensional image. The advantage of removing an aliasing effect may also apply to a pinhole mask according to another embodiment. Also, the plurality of holes 32 included in the first pinhole mask 30 may be formed at one time using one photomask. The first pinhole mask 30 includes the plurality of holes 32 so that a large amount of light may be transmitted. Therefore, when the first pinhole mask 30 is applied to a display device, the display device may secure high light transmittance.

In another embodiment, the arrangement of holes in some of the nine cell areas (1, 1) to (1, 3), (2, 1) to (2, 3), and (3, 1) to (3, 3) may be the same. This arrangement will be described with reference to FIG. 2.

Figure 2:
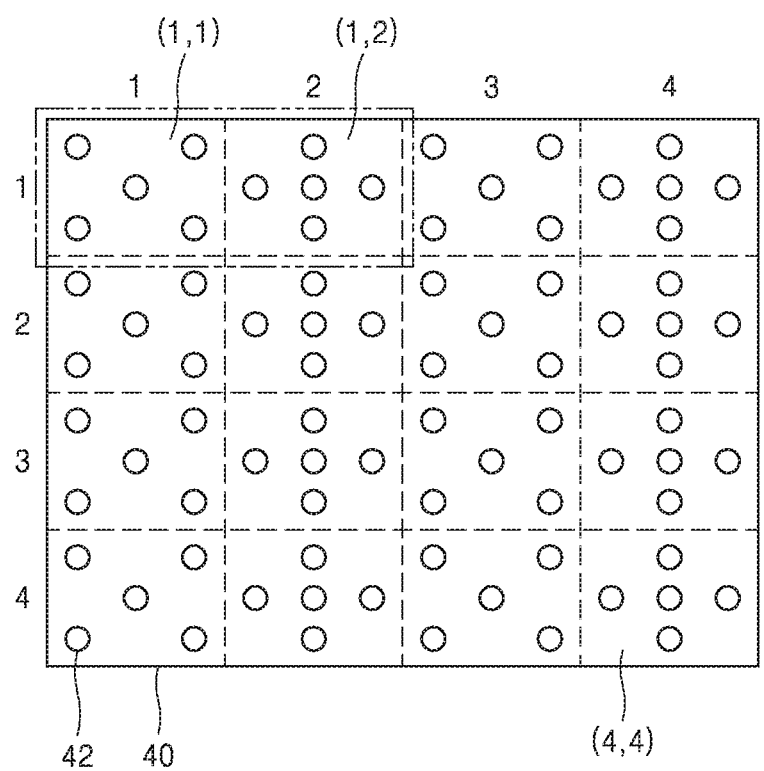
FIG. 2 is a front view of a second pinhole mask according to an embodiment.

FIG. 2 shows a second pinhole mask according to an embodiment.

Referring to FIG. 2, a second pinhole mask 40 includes, but is not limited to, a plurality of cell areas (1, 1) . . . (4, 4) of 4 rows and 4 columns. Each of the cell areas (1, 1) . . . (4, 4) includes a plurality of holes 42. When a distribution of the plurality of holes 42 formed in the first cell area (1, 1) is referred to as a first distribution and a distribution of the plurality of holes 42 formed in the second cell area (1, 2) is referred to as a second distribution, half of the cell areas (1, 1) . . . (4, 4) in the second pinhole mask 40 may have the first distribution and the remaining may have the second distribution. In other words, a basic hole distribution may be defined as a first distribution adjacent to a second distribution as shown in FIG. 2. The distribution of the plurality of holes 42 formed in the second pinhole mask 40 may then be the repeated pattern of the basic hole distribution. This type of second pinhole mask 40 may be formed by repeatedly using one photomask used to form the basic hole distribution. Therefore, the second pinhole mask 40 may be formed in a large area.

Meanwhile, although five holes 42 are formed in the first cell area (1, 1) and the second cell area (1, 2), respectively, more or fewer than five holes 42 may be formed in each of the first cell area (1, 1) and the second cell area (1, 2). The number of holes 42 formed in the first cell area (1, 1) may be different from that in the second cell area (1, 2).

Embodiments shown in FIGS. 1 and 2 may be combined. For example, a group of cell areas may have a random hole distribution as shown in FIG. 1 and the remaining cell areas may have pinholes distributed in a repeating pattern as shown in FIG. 2.

Figure 3:
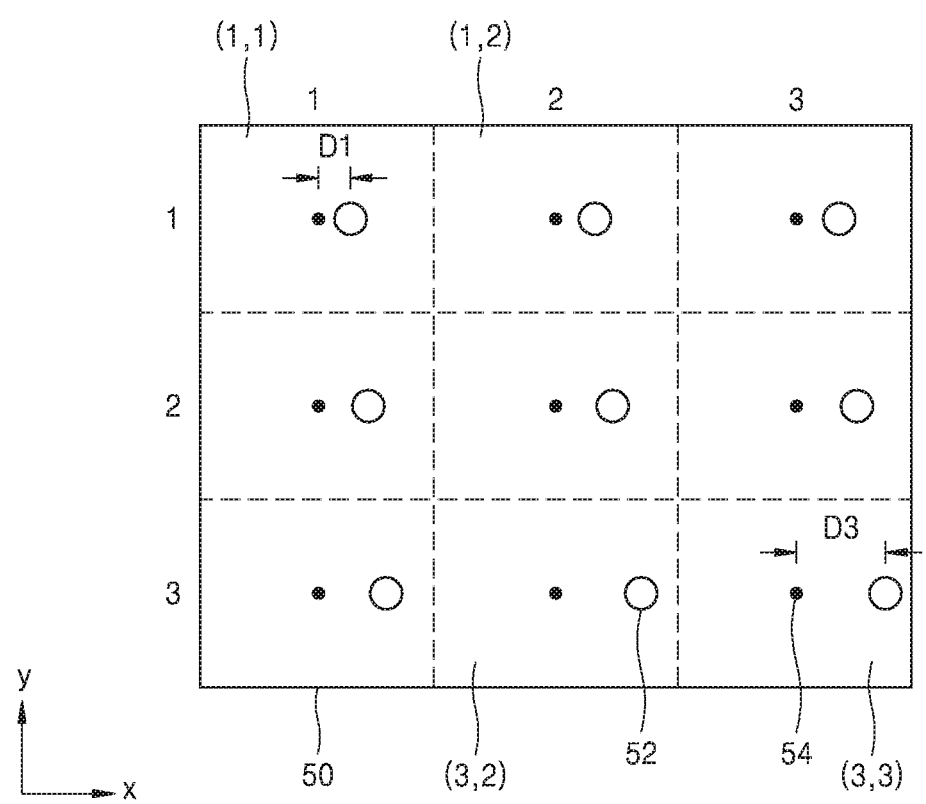
FIGS. 3 and 4 are front views of a third pinhole mask according to an embodiment.

FIG. 3 is a front view of a third pinhole mask according to an embodiment.

Referring to FIG. 3, a third pinhole mask 50 includes a plurality of cell areas (1, 1) . . . (3, 3) in three rows and three columns and a plurality of holes 52. The third pinhole mask 50 is not limited to the cell areas in three rows and three columns, and may include cell areas in more than three rows and three columns. Only one hole 52 is formed in each of the plurality of cell areas (1, 1) . . . (3, 3). Positions of the holes 52 are all different for each cell area. That is, a distance between a center 54 of a cell area and the hole 52 may be different for each cell area. As an example, a distance between the center 54 of the cell area and the hole 52 in the first cell area (1, 1) may be a first distance D1 and a distance between the center 54 of the cell area and the hole 52 in the ninth cell area (3, 3) may be a third distance D3. The third distance D3 is greater than the first distance D1. A distance between the center 54 of the cell area and the hole 52 in the second to eighth cell areas (1, 2) . . . (3, 2) may be greater than the first distance D1 and less than the third distance D3. The distance between the center 54 of the cell area and the hole 52 may gradually increase from the first cell area (1, 1) to the ninth cell area (3, 3). The center 54 of each cell area may correspond to a center of each pixel of a flat panel display.

Figure 4:
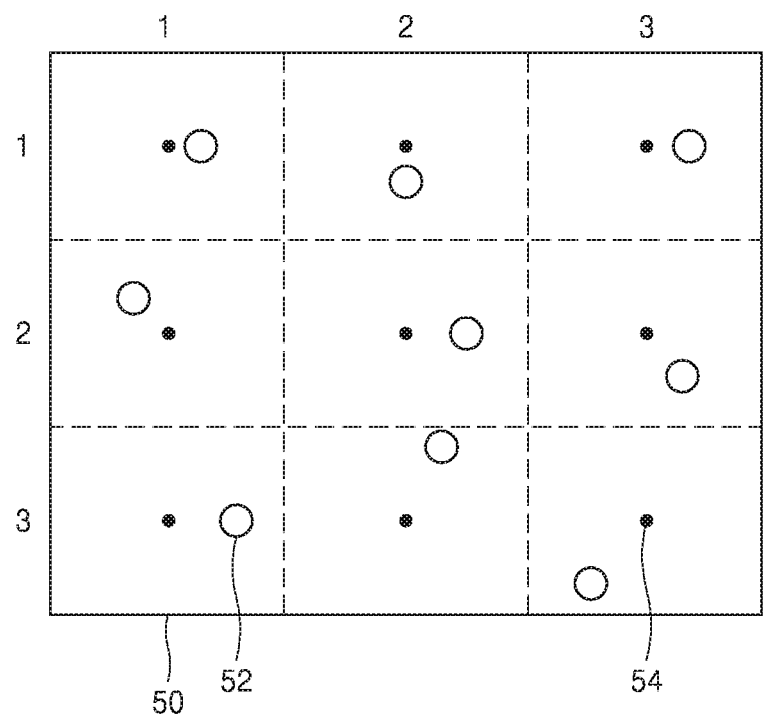

In an embodiment, the hole 52 is positioned a distance away from the center 54 of the cell area only in an x-axis direction. However, in another embodiment, the hole 52 may not only be distanced in the x-axis direction but also in another direction. FIG. 4 shows an example in which the hole 52 is positioned at a distance away from the center 54 of the cell area in varying directions.

A plurality of holes formed in each cell area in the pinhole mask may have various distributions. In a direction away from the center of the cell area, the number of holes may be constant or vary depending on a distance. In other words, the density of holes may vary depending on the distance, or may be constant. FIGS. 5 to 8 show examples of this.

Figure 5:
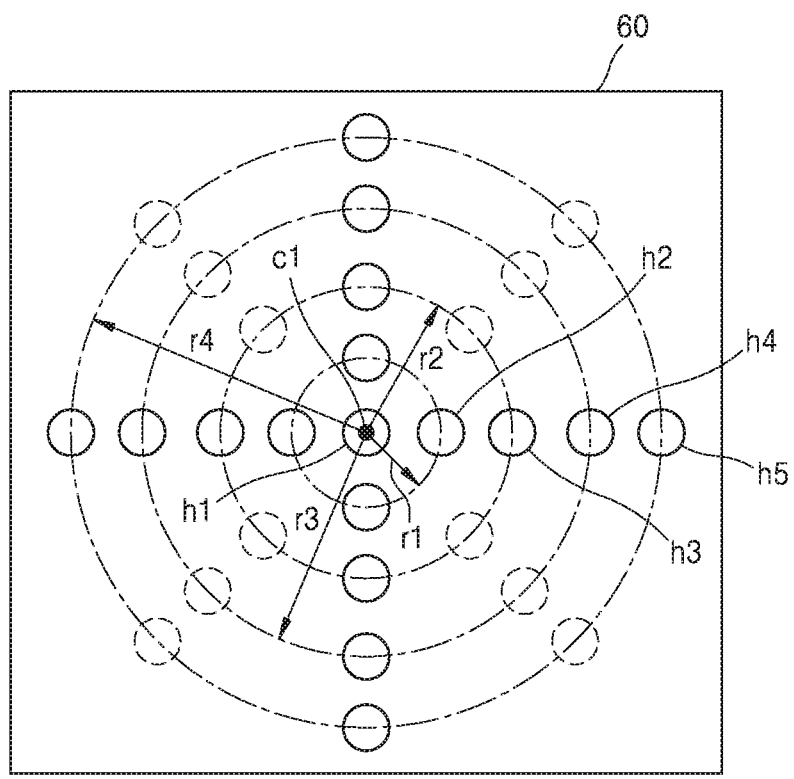
FIG. 5 is a front view of a selected one of the cell areas in a pinhole mask for explaining a first distribution of a plurality of holes formed in the pinhole mask according to an embodiment.

FIG. 5 is a front view of a selected one of the cell areas in a pinhole mask for explaining a first distribution of a plurality of holes formed in the pinhole mask according to an embodiment. In FIG. 5, concentric circles of dashed lines are not physically formed and are indicated for convenience only to illustrate the arrangement and arrangement distances of the holes.

Referring to FIG. 5, a cell area 60 includes first to fifth holes h1 to h5. Dimensions (e.g., a diameter, a shape, etc.) of the first to fifth holes h1 to h5 may be equal to or different from each other. One first hole h1 is in the middle of the cell area 60. The first hole h1 may include a center c1. That is, a center of the first hole h1 may be positioned at a center of the cell area 60.

When a pinhole mask of the embodiment is applied to a display (e.g., a holographic display), the center c1 of the cell area 60 may correspond to a center of a pixel of the display. Thus, when the pinhole mask of the embodiment is applied to the display, the pinhole mask may be attached to the display such that the center c1 of the cell area 60 coincides with the center of the pixel of the display.

Subsequently, at least one second hole h2 (i.e., a group of pinholes) is positioned at a first distance r1 from the center c1 (i.e., a predetermined distance). The cell area 60 includes four second holes h2, but the number of second holes h2 is not limited thereto and may be more or less than four (i.e., a predetermined number of pinholes). The second holes h2 are distributed concentrically around the center c1. Third holes h3 are disposed farther from the center c1 than the second holes h2. That is, the third holes h3 are positioned at a second distance r2 from the center c1. The second distance r2 is greater than the first distance r1. The number of third holes h3 may be equal to the number of second holes h2. The third holes h3 are distributed concentrically around the center c1. A third hole h3 may be formed at another position while maintaining the second distance r2. For example, the third hole h3 may be formed at a position of a dotted circle. Fourth holes h4 are positioned at a third distance r3 from the center c1. The third distance r3 is greater than the second distance r2. The number of fourth holes h4 may be equal to the number of second holes h2. The fourth holes h4 may be distributed in the same manner as the second holes h2. That is, the fourth holes h4 may be distributed concentrically around the center c1. A fourth hole h4 may be formed at another position at the same distance, for example, at a position of a dotted circle shown in FIG. 5. The cell area 60 may include four fourth holes h4. Fifth holes h5 are positioned at a fourth distance r4 from the center c1. The fourth distance r4 is greater than the third distance r3. The number of fifth holes h5 may be equal to the number of second holes h2. The fifth holes h5 may be distributed concentrically around the center c1. A fifth hole h5 may be formed at another position at the same distance, for example, at a position of a dotted circle.

Although not shown in FIG. 5, the cell area 60 may have a sixth hole, a seventh hole, and the like in a direction away from the center c1. The number of each of the sixth holes, seventh holes, and the like may be the same as the number of second holes h2.

As described above, the first to fifth holes h1 to h5 included in the cell area 60 are distributed in the same number at different distances from the center c1. In the first distribution, the density of holes increases toward the center c1 and decreases as a distance from the center c1 increases.

Figure 6:
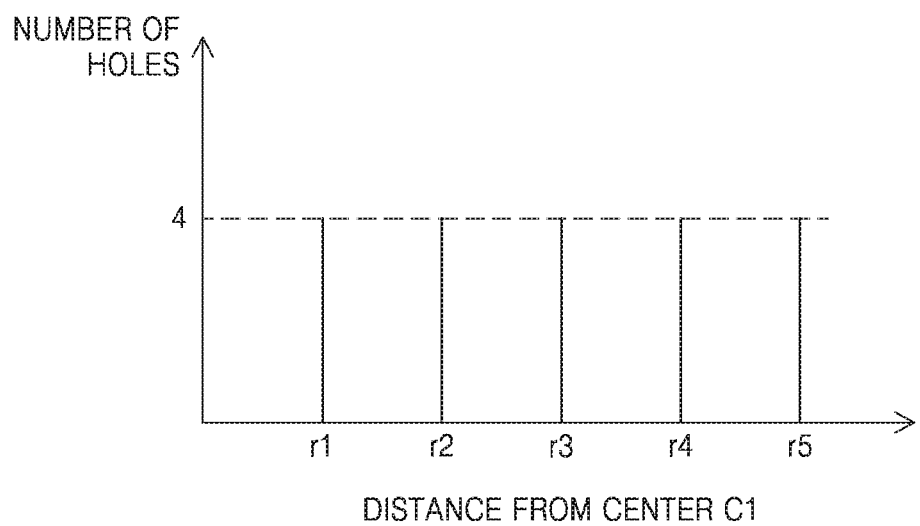
FIG. 6 is a graph showing a distribution according to a distance of a plurality of holes formed in the cell area of FIG. 5.

The first to fifth holes h1 to h5 included in the cell area 60 are distributed in a constant number along the distance from the center c1. In other words, each distance from the center c1 may include the same number of holes. A graphical representation of the first distribution may be as shown in FIG. 6. In FIG. 6, the horizontal axis indicates a distance radially away from the center c1 of the cell area 60, that is, a distance from the center c1 to an edge of the cell area 60, and the vertical axis indicates the number of holes at each distance. FIG. 6 shows that the number of holes formed in the cell area 60 is constantly distributed along a distance in a direction away from the center c1.

Figure 7:
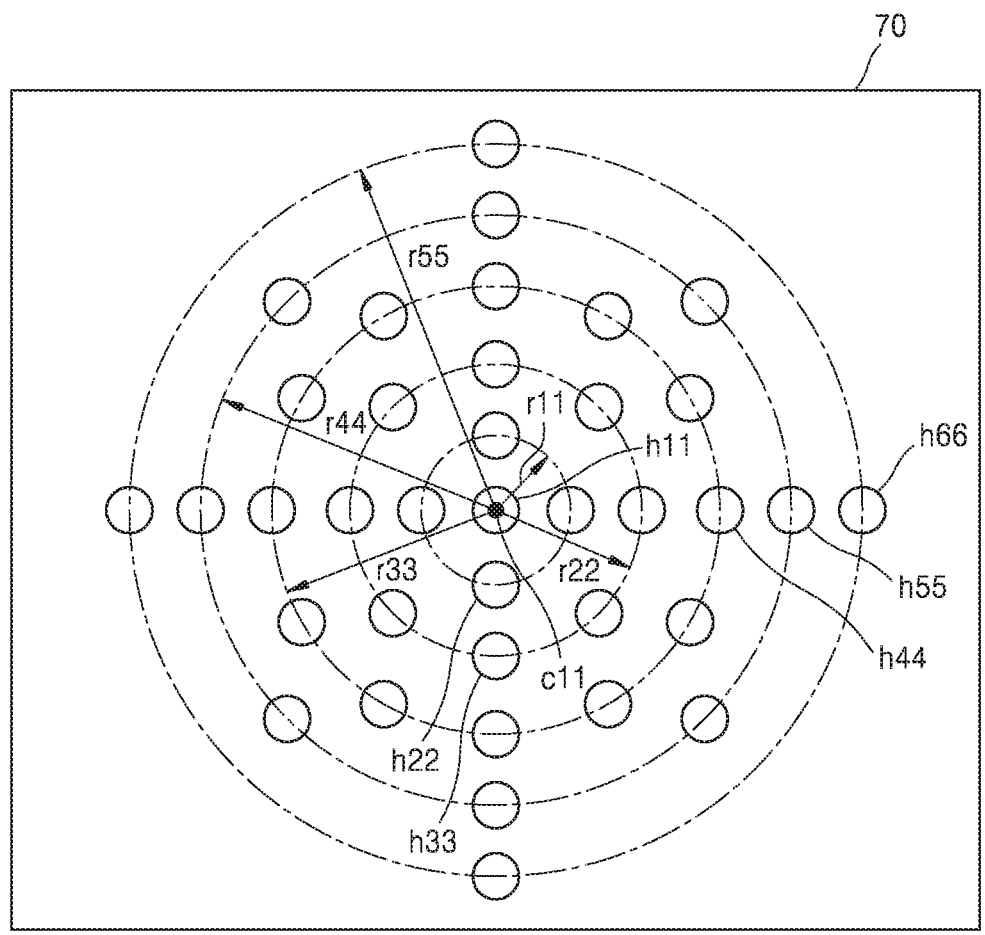
FIG. 7 is a front view of a selected one of the cell areas in a pinhole mask for explaining a second distribution pattern of a plurality of holes formed in the pinhole mask according to an embodiment.

FIG. 7 is a front view of a selected one of the cell areas in a pinhole mask for explaining a second distribution pattern of a plurality of holes formed in the pinhole mask according to an embodiment. In FIG. 7, concentric circles of dashed lines are not physically formed and are indicated for convenience only to illustrate the arrangement and arrangement distances of the holes.

Referring to FIG. 7, a cell area 70 includes a plurality of holes h11 to h66. Sizes of the plurality of holes h11 to h66 may be equal to or different from each other. The plurality of holes h11 to h66 may be distributed concentrically around a center c11. The first hole h11 is located at the center c11 of the cell area 70. Characteristics related to dimensions and position of the first hole h11 may be the same as those of the first hole h1 in FIG. 5. The first hole h11 may be optional. Therefore, the cell area 70 may not include the first hole h11. The second hole h22 is located at a first distance r11 from the center c11. Four second holes h22 may be formed around the center c11. The third hole h33 is formed at a second distance r22 from the center c11. The second distance r22 is greater than the first distance r11. Eight third holes h33 may be distributed around the center c11. The fourth hole h44 is located at a third distance r33 from the center c11. The third distance r33 is greater than the second distance r22. Twelve fourth holes h44 may be distributed around the center c11. The fifth hole h55 is located at a fourth distance r44 from the center c11. The fourth distance r44 is greater than the third distance r33. Eight fifth holes h55 may be distributed around the center c11. The sixth hole h66 is at a fifth distance r55 from the center c11. The fifth distance r55 is greater than the fourth distance r44. Four sixth holes h66 may be distributed around the center c11.

Figure 8:
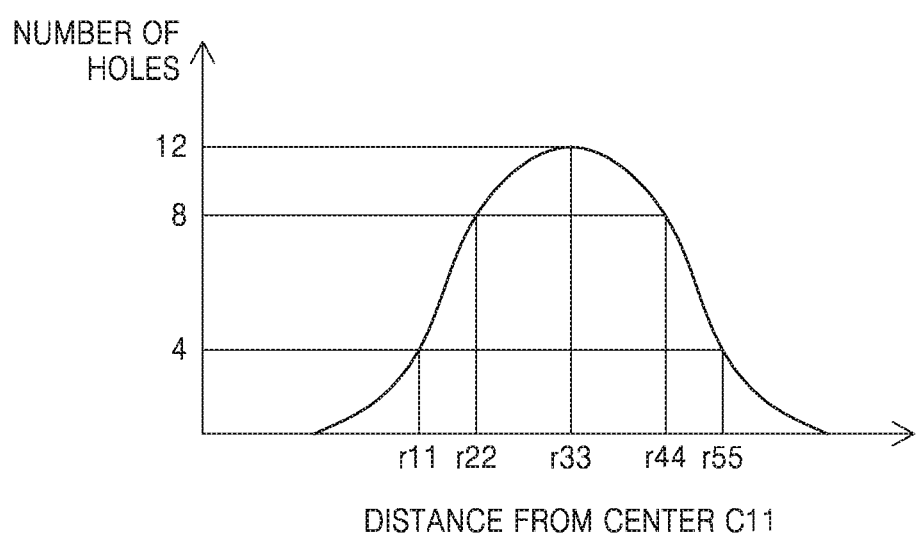
FIG. 8 is a graph showing a distribution according to a distance of a plurality of holes formed in the cell area of FIG. 7.

FIG. 8 shows a distribution according to distances of the plurality of holes h11 to h66 formed in the cell area 70 of FIG. 7. In FIG. 8, the horizontal axis indicates a distance measured from the center c11 of the cell area 70. The vertical axis indicates the number of holes at each distance from the center c11.

Referring to FIG. 8, the plurality of holes h11 to h66 have a normal distribution or a Gaussian distribution. That is, in the cell area 70, the largest number of holes are distributed at a point intermediate between the first distance r11 and the fifth distance r55, and the cell area 70 has a hole distribution in which the number of holes decreases from this point toward the center c11 and toward an edge of the cell area.

Figure 9:
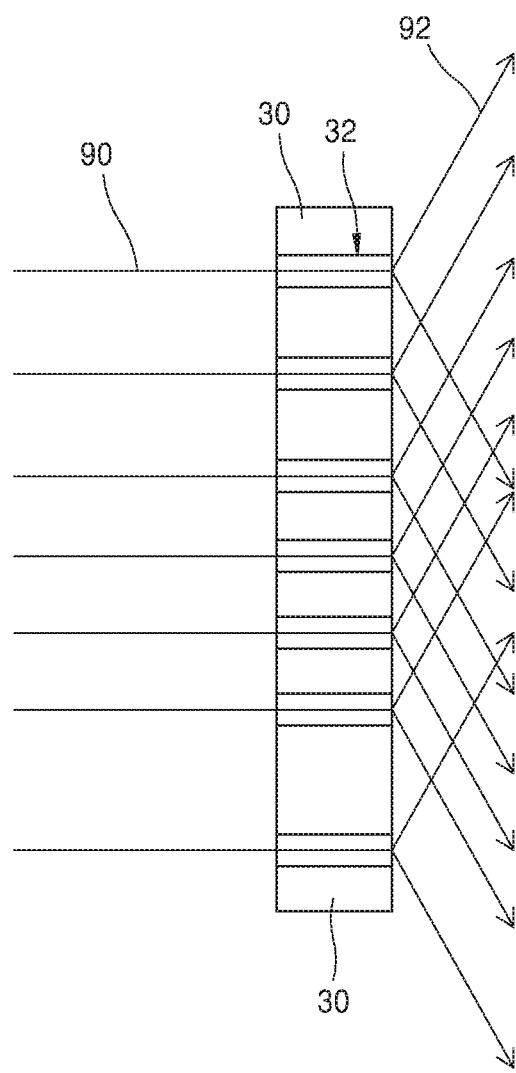
FIG. 9 is a cross-sectional view taken along line 9-9' of FIG. 1.

FIG. 9 is a cross-sectional view taken along line 9-9' of FIG. 1.

Referring to FIG. 9, the first pinhole mask 30 includes the plurality of holes 32. As shown and as described above regarding FIG. 1, distances of the plurality of holes 32 from the center of the pinhole mask 30 and from each other are not constant. The plurality of holes 32 are formed through the first pinhole mask 30. Each of the plurality of holes 32 is a pinhole, and light 90 incident on each hole 32 passes through the hole 32 to become diffracted light 92 and spread widely. A viewing angle at which the light 90 can be seen may be determined by a diffraction angle by the hole 32. Therefore, when the light 90 includes image information, for example, a three-dimensional image or a holographic image, a region where the image information can be seen from a right side of the first pinhole mask 30 as shown in FIG. 9 may be wider than when there is no first pinhole mask 30. That is, since the first pinhole mask 30 is positioned in the optical path of the light 90, a viewing angle at which the image information can be seen may be increased as compared to when there is no first pinhole mask 30.

Figure 10:
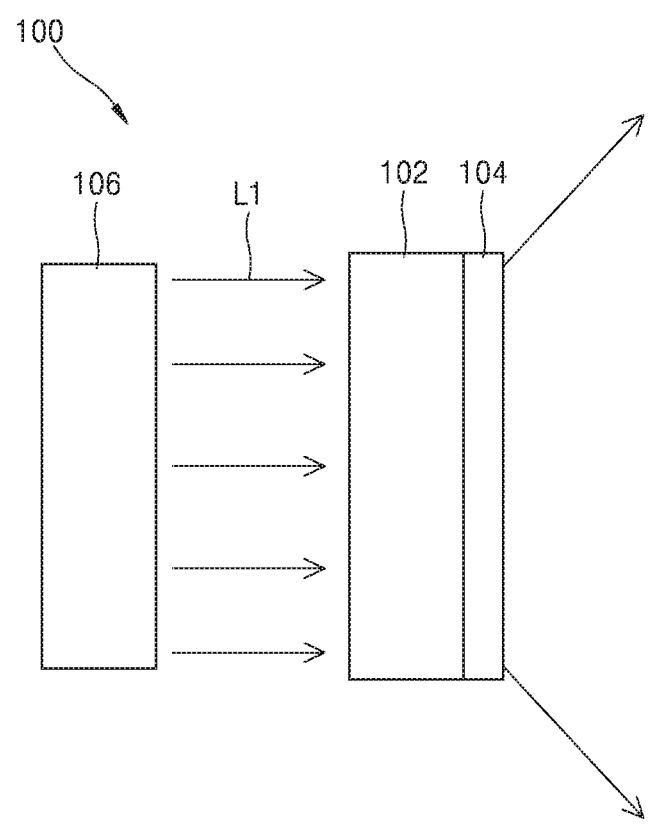
FIG. 10 is a cross-sectional view of a flat panel display according to an embodiment.

FIG. 10 is a cross-sectional view of a flat panel display according to an embodiment.

Referring to FIG. 10, a flat panel display 100 according to an embodiment includes a light source unit 106 (i.e., a light source), a flat panel 102, and a viewing angle expansion plate 104. The light source unit 106 may include a light source that generates parallel light L1 incident on the flat panel 102, or may include a light generation system. The flat panel 102 may include, for example, a liquid crystal display (LCD) panel. The LCD panel may be a panel for displaying a holographic image, that is, a hologram. Thus, the flat panel display 100 may include a holographic display. The parallel light L1 may be used as reference light for displaying a hologram. The viewing angle expansion plate 104 may be attached to a holographic image-emitting surface of the flat panel 102. Another member that is entirely transparent and flat may be located between the viewing angle expansion plate 104 and the flat panel 102. The viewing angle expansion plate 104 expands light emitted from the flat panel 102 more widely, thereby increasing a viewing angle. Accordingly, a viewer may view an image at a wider angle than when there is no viewing angle expansion plate 104. As a result, the viewing angle expansion plate 104 widens an area where a viewer can view a holographic image.

The viewing angle expansion plate 104 may be an optical plate including a configuration for refracting or diffracting incident light. As an example, the viewing angle extension plate 104 may be a pinhole mask according to embodiments described above. In another embodiment, the optical diffuser stated in the description of FIG. 1 may be used in place of the viewing angle expansion plate 104. The viewing angle expansion plate 104 of an embodiment does not include a factor causing image loss. Therefore, by using the viewing angle expansion plate 104 of an embodiment, it is possible to widen a viewing angle without image (e.g., holographic image) loss.

Figure 11:
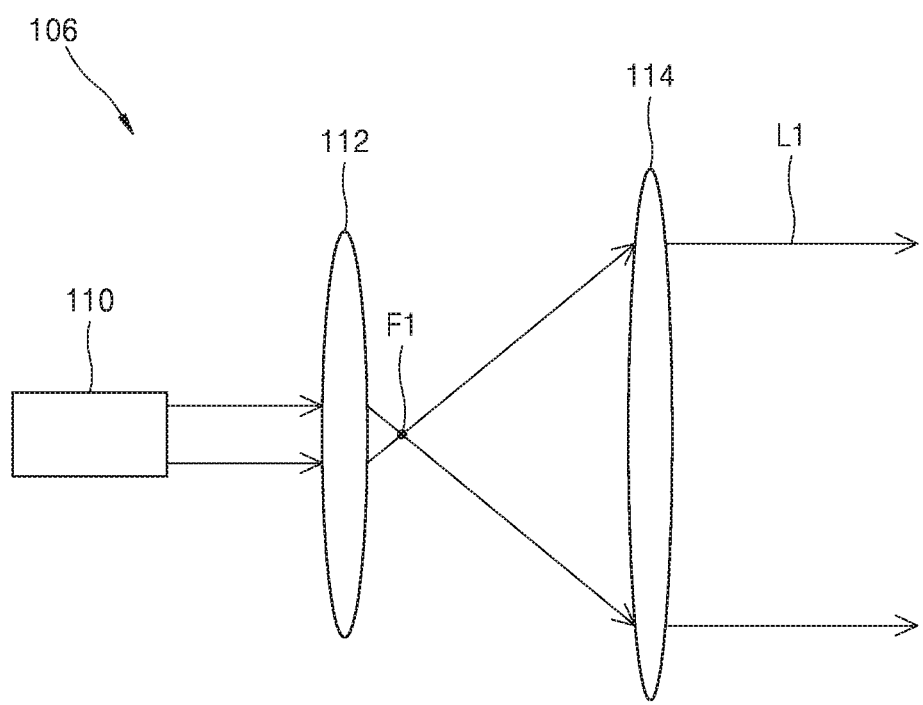
FIG. 11 is a cross-sectional view illustrating an example of a configuration of a light source unit of FIG. 10.

FIG. 11 shows an example of a configuration of the light source unit 106 of FIG. 10.

Referring to FIG. 11, the light source unit 106 includes a light source 110 and first and second lenses 112 and 114. The light source 110 may include a light source that emits parallel light, for example, a light source that emits a laser beam. The first and second lenses 112 and 114 may include convergent lenses, for example, convex lenses. The first lens 112 is between the light source 110 and the second lens 114. The second lens 114 is between the first lens 112 and the flat panel 102. Respective focal lengths of the first lens 112 and the second lens 114 may be different from each other. Parallel light emitted from the light source 110 is converged to a focus F1 of the first lens 112. The focus F1 is also a focus of the second lens 114. As such, the first lens 112 and the second lens 114 may be arranged so that the focuses of the first lens 112 and the second lens 114 are located at the same position. Accordingly, the light passing through the focus F1 of the first lens 112 is incident on the second lens 114 and converted into the parallel light L1 by the second lens 114 and is incident on the flat panel 102.

Other optical members that function in an equivalent manner to the first lens 112 and the second lens 114 may be used in place of the first lens 112 and the second lens 114. For example, a meta lens or an optical member based on a turbid medium may be used.

Figure 12:
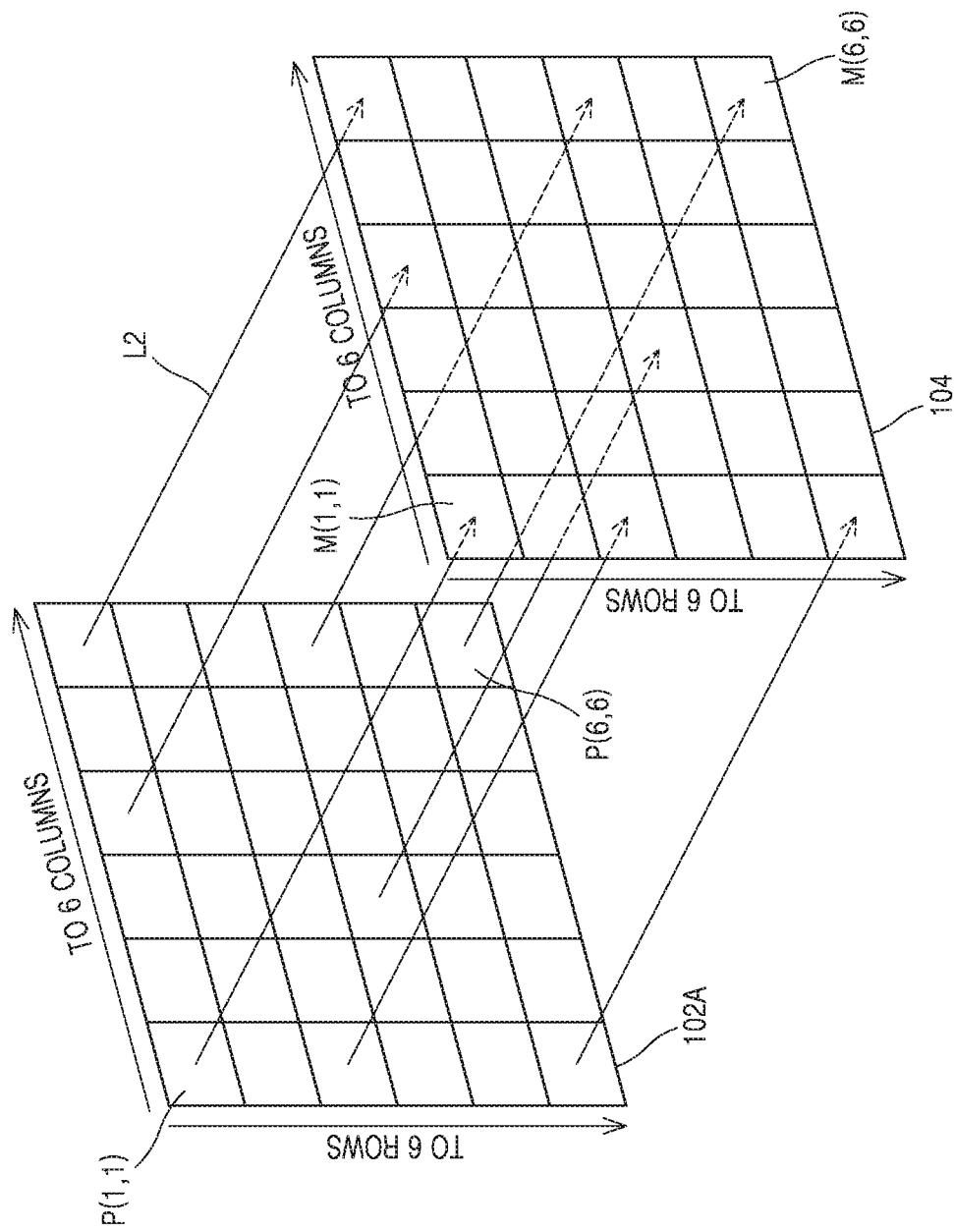
FIG. 12 is a three-dimensional view of correspondence between pixels of a flat panel and a viewing angle expansion plate of FIG. 10.

FIG. 12 shows correspondence between pixels of the flat panel 102 and the viewing angle expansion plate 104.

Referring to FIG. 12, a pixel plane 102A of the flat panel 102 includes a plurality of pixels P(1, 1) . . . P(6, 6), and the viewing angle expansion plate 104 also includes a plurality of cell areas M(1, 1) . . . M(6, 6). The number of pixels P(1, 1) . . . P(6, 6) in the pixel plane 102A may be equal to the number of cell areas M(1, 1) . . . M(6, 6) in the viewing angle expansion plate 104. Accordingly, the plurality of pixels P(1, 1) . . . P(6, 6) in the pixel plane 102A may correspond to the plurality of cell areas M(1, 1) . . . M(6, 6) in the viewing angle expansion plate 104 on a one-to-one basis. That is, one pixel (e.g., the first pixel P (1, 1)) selected from the plurality of pixels P(1, 1) . . . P(6, 6) may correspond to the first cell area M(1, 1) of the viewing angle expansion plate 104. Accordingly, light or an image emitted through the plurality of pixels P(1, 1) . . . P(6, 6) may be emitted through each of the cell areas M(1, 1) . . . M(6, 6) of the viewing angle expansion plate 104 corresponding to the plurality of pixels P(1, 1) . . . P(6, 6). Although the pixel plane 102A and the viewing angle expansion plate 104 are described as respectively including pixels and cell areas in 6 rows and 6 columns, this is for convenience of explanation only, and the pixels and cell areas are not limited to six rows and six columns. A flat panel display may include pixels in 6 rows and 6 columns or more.

Figure 13:
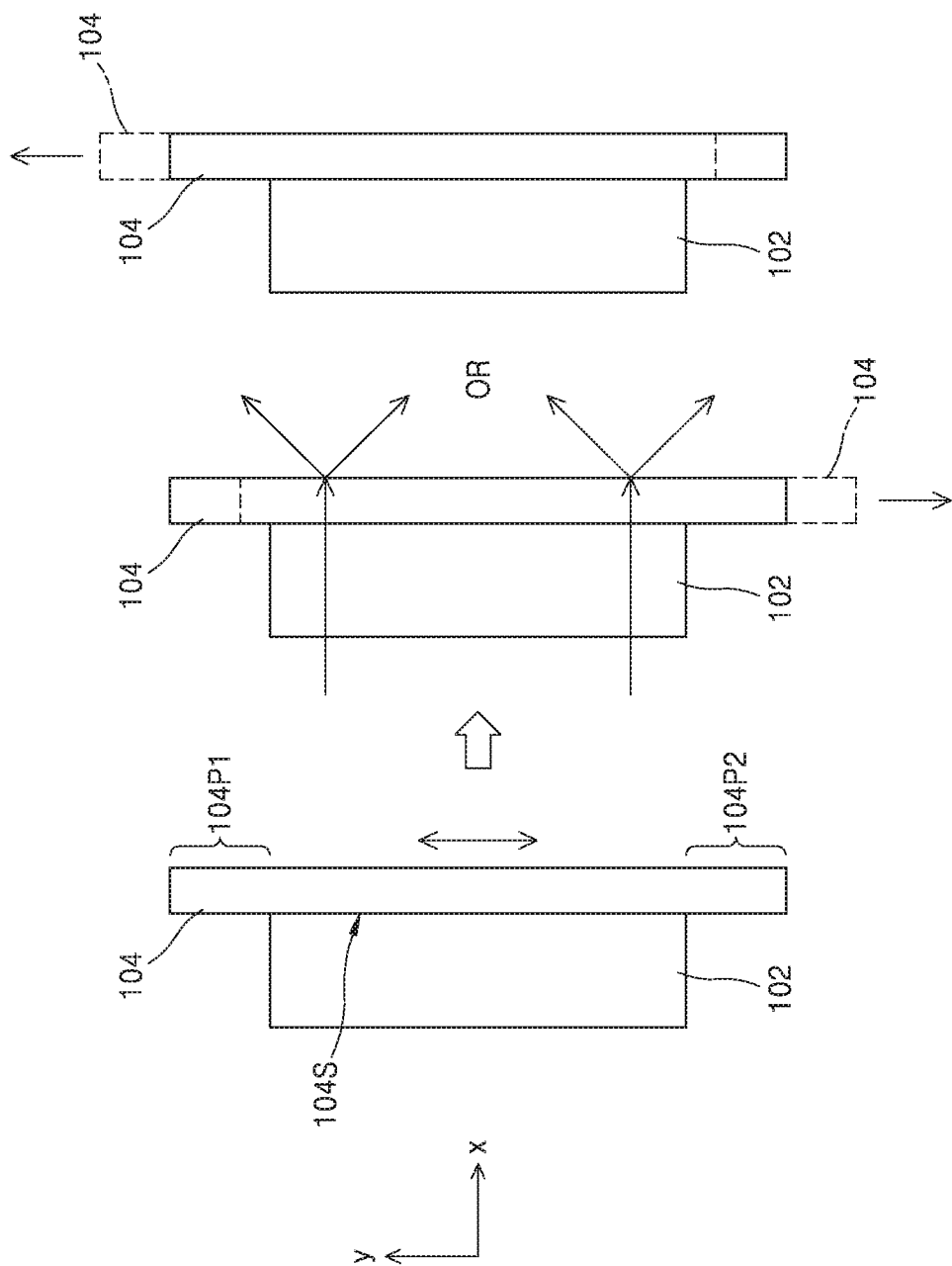
FIG. 13 is a cross-sectional view of a translational motion (linear motion) of a viewing angle expansion plate in the flat panel display of FIG. 10.

FIG. 13 shows a case where the viewing angle expansion plate 104 is translated or linearly moved in the flat panel display of FIG. 10.

Referring to FIG. 13, a surface 104S of the viewing angle expansion plate 104 that faces the flat panel 102 is wider than the flat panel 102. That is, the viewing angle expansion plate 104 includes portions 104P1 and 104P2 protruding from edges of the flat panel 102 in a direction (y-axis direction) parallel to an image-emitting surface of the flat panel 102. A protruding length of the protruding portions 104P1 and 104P2 may be greater than a range of a translational motion in the y-axis direction of the viewing angle expansion plate 104. That is, a moving distance of the viewing angle expansion plate 104 in the y-axis direction due to the translational motion in the y-axis direction may be less than the length of the protruding portions 104P1 and 104P2 of the viewing angle expansion plate 104. Therefore, even if the viewing angle expansion plate 104 is translated, the entire image-emitting surface of the flat panel 102 may be covered with the viewing angle expansion plate 104.

The viewing angle expansion plate 104 may perform translational motion or linear motion in a plane perpendicular to the x-axis, that is, in a y-z plane as shown in FIG. 13.

This translational motion of the viewing angle expansion plate 104 may smoothly average speckle pattern noise that may appear in the conventional holographic display. Accordingly, the visibility of a displayed three-dimensional image may be increased.

Figure 14:
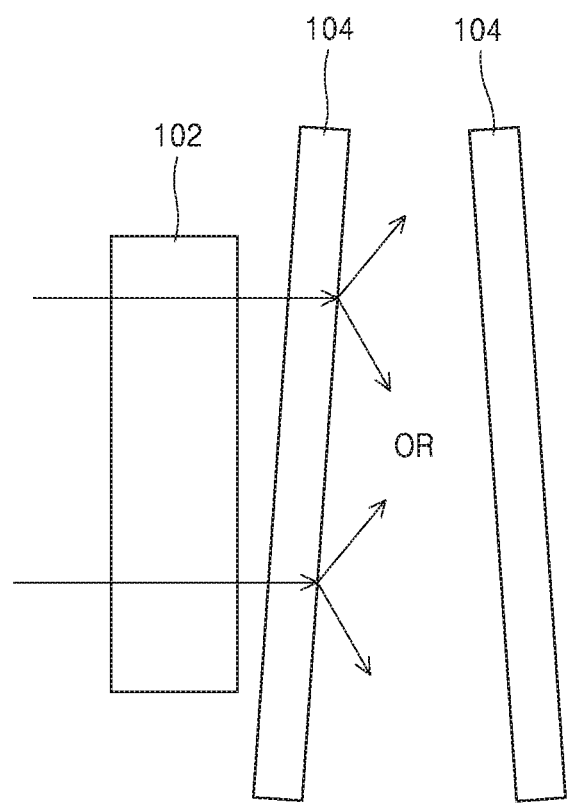
FIG. 14 is a cross-sectional view illustrating a case where a viewing angle expansion plate is inclined in a flat panel display according to an embodiment.

FIG. 14 shows a case where a viewing angle expansion plate is inclined in a flat panel display according to an embodiment.

Referring to FIG. 14, the viewing angle expansion plate 104 is inclined at a given angle with respect to the flat panel 102. That is, the flat panel 102 and the viewing angle expansion plate 104 are not parallel to each other. The viewing angle expansion plate 104 may be spaced apart from the flat panel 102 but a portion of the viewing angle expansion plate 104 may be disposed on a portion of the flat panel 102, for example, to be in contact with either edge of the flat panel 102.

By adjusting the inclination angle of the viewing angle expansion plate 104, speckle pattern noise that may appear in the conventional holographic display may be minimized or eliminated. Accordingly, the visibility of a three-dimensional image displayed on the flat panel 102 may be increased.

Figure 15:
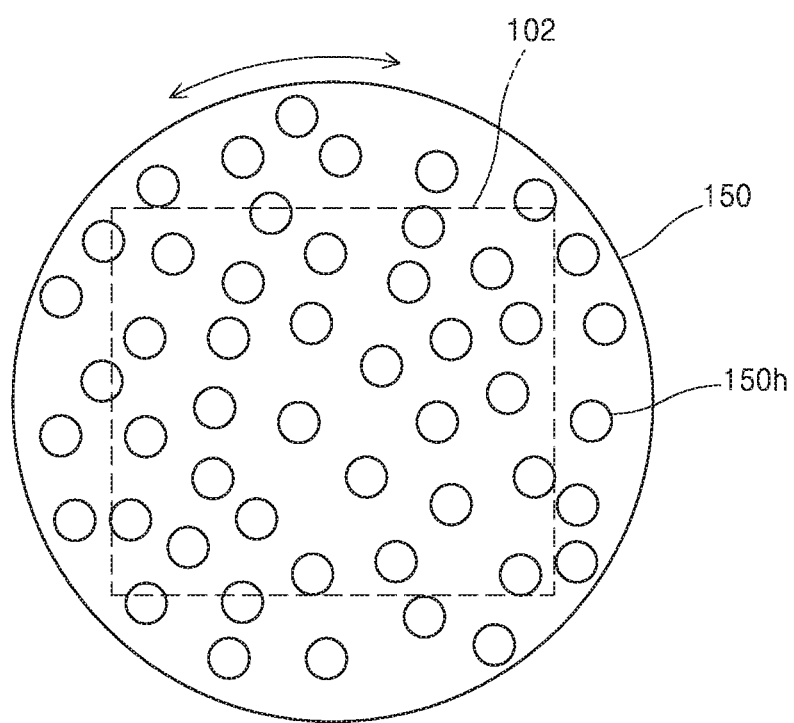
FIG. 15 is a front view illustrating a case where a viewing angle expansion plate is rotated in a flat panel display according to an embodiment.

FIG. 15 shows a case where a viewing angle expansion plate is rotated in a flat panel display according to an embodiment.

Referring to FIG. 15, a viewing angle expansion plate 150 may be a front plate of the flat panel 102, that is, a circular plate having a larger area than a plane on which an image is displayed. The entire front plate of the flat panel 102 may therefore be covered with the viewing angle expansion plate 150. The viewing angle expansion plate 150 includes a plurality of holes 150h. The plurality of holes 150h are randomly formed in the entire viewing angle expansion plate 150.

While the flat panel 102 is operating, the viewing angle expansion plate 150 may be rotated clockwise or counter-clockwise. Here, a rotation speed may be constant or not. The viewing angle expansion plate 150 may be rotated in a range of a given rotation angle. The viewing angle expansion plate 150 may be rotated in a direction or at a rotation speed in which or at which drawbacks or problems of the conventional holographic display are solved. As an example, the viewing angle expansion plate 150 may be rotated using a rotation condition that minimizes or eliminates speckle pattern noise that may appear in the conventional holographic display. This rotation may increase the visibility of a holographic image.

The plurality of holes 150h are randomly distributed over the entire area of the viewing angle expansion plate 150 such that at least one hole 150h or the plurality of holes 150h may correspond to each of a plurality of pixels of the flat panel 102. Even if the viewing angle expansion plate 150 is a circular plate, a distribution of the holes 150h in each cell area of the viewing angle expansion plate 150 may have a uniform distribution or a Gaussian distribution as described with reference to FIGS. 5 to 8.

The viewing angle expansion plate 150 of FIG. 15 may be replaced with the viewing angle expansion plate 104 of FIGS. 13 and 14.

On the other hand, the viewing angle expansion plate 150 of FIG. 15 may be replaced by the viewing angle expansion plate 104 having the protruding portions 104P1 and 104P2 of FIG. 13. That is, the viewing angle expansion plate 104 of FIG. 13 may also be rotated.

Figure 16:
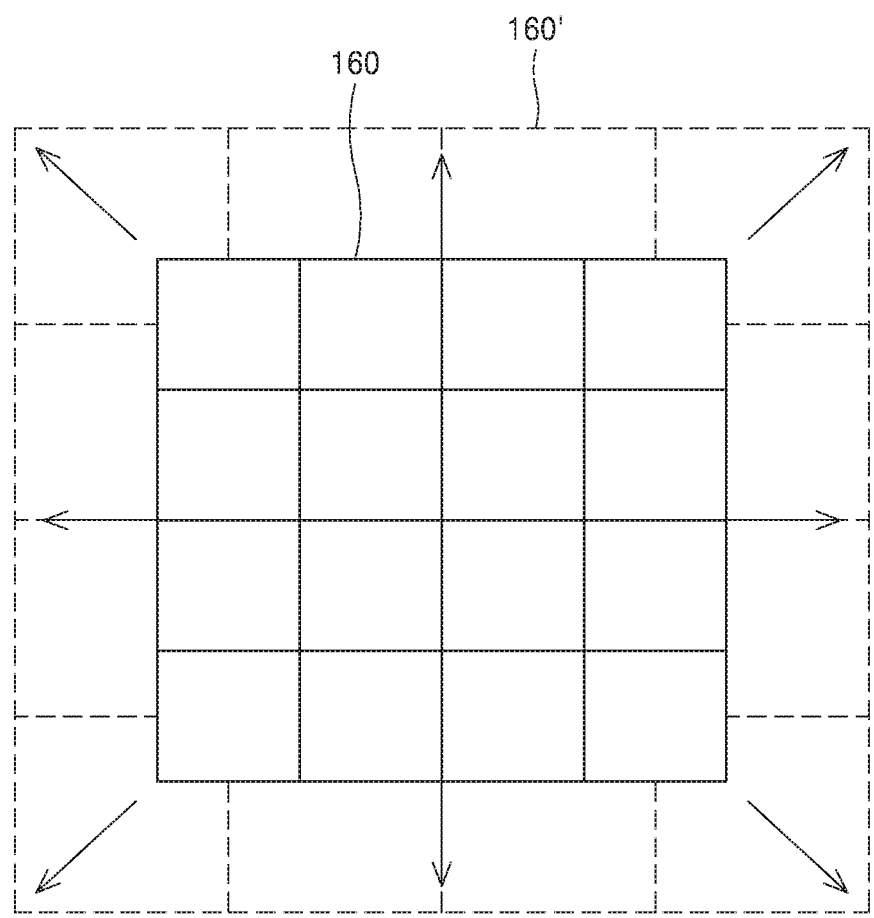
FIG. 16 is a plan view illustrating a case where a viewing angle expansion plate is expanded in all directions in a flat panel display according to an embodiment.

FIG. 16 shows a case where a viewing angle expansion plate is expanded in all directions in a flat panel display according to an embodiment.

In FIG. 16, reference numeral 160 denotes a viewing angle expansion plate before expansion, and reference numeral 160' denotes an expanded viewing angle expansion plate.

Referring to FIG. 16, the viewing angle expansion plate 160 may be expanded in all directions. The viewing angle expansion plate 160 before expansion may cover the entire pixel plane 102A of the flat panel 102. The expanded viewing angle expansion plate 160' may be the viewing angle expansion plate 104 of FIG. 13. After being expanded, the expanded viewing angle expansion plate 160' may be contracted and restored to the viewing angle expansion plate 160.

Further, in an embodiment, both the viewing angle expansion plate 160 and the expanded viewing angle expansion plate 160' may be circular rather than square. In this case, the expanded viewing angle expansion plate 160' may be the viewing angle expansion plate 150 of FIG. 15.

The viewing angle expansion plate 160 may be expanded in all directions using a physical device or an electrical device.

The motion and deformation of the viewing angle expansion plate described with reference to FIGS. 13 to 16 may be equally applied to a case where the viewing angle expansion plate is replaced with the optical diffuser described with reference to FIG. 1.

A viewing angle expansion plate according to an embodiment includes a plurality of pinholes over the entire area. Therefore, light incident on the viewing angle expansion plate is diffracted by the pinholes with a large diffraction angle. When such a viewing angle expansion plate is applied to a flat panel display such as a holographic display, a viewing angle of the flat panel display is determined by the diffraction angle of the pinhole, so that the viewing angle may be increased without affecting an image size of the flat panel display. In addition, the viewing angle expansion plate according to an embodiment may be formed by repeatedly using a single photomask in a manufacturing process, thereby realizing a wide viewing angle expansion plate. Accordingly, a wide flat panel display may be implemented. In addition, the viewing angle expansion plate according to an embodiment includes a plurality of pinholes and may transmit a large amount of light. Therefore, light transmittance may be relatively increased.

Although a number of matters have been specifically described in the above description, they should not be construed as limiting the scope of the disclosure, but rather should be construed as examples of specific embodiments. While one or more embodiments have been described with reference to the figures, it will be understood by those of ordinary skill in the art that various changes in form and details may be made therein without departing from the spirit and scope as defined by the following claims.

What is claimed is:

1. A viewing angle expansion plate comprising:
a plurality of cell areas; and
a plurality of pinholes formed in the plurality of cell areas,
wherein each cell area from among the plurality of cell areas corresponds to a respective pixel from among a plurality of pixels in a flat panel display, and
wherein the plurality of cell areas comprises a first cell area in which a first number of a first plurality of pinholes are formed and a second cell area in which a second number of a second plurality of pinholes are formed, the second number being different from the first number, and
wherein a number of pinholes formed in each cell area of the plurality of cell areas is different from the number of pinholes formed in each other cell area of the plurality of cell areas.

2. The viewing angle expansion plate of claim 1, wherein the plurality of pinholes are randomly distributed throughout the plurality of cell areas.

3. The viewing angle expansion plate of claim 1, wherein each cell area from among the plurality of cell areas includes at least one pinhole from among the plurality of pinholes.

4. The viewing angle expansion plate of claim 1, wherein a first distribution of pinholes formed in a first cell area from among the plurality of cell areas is the same as a second distribution of pinholes formed in a second cell area from among the plurality of cell areas.

5. The viewing angle expansion plate of claim 1, wherein the plurality of pinholes are randomly distributed in a group of cell areas from among the plurality of cell areas, and
wherein the plurality of pinholes are distributed in a repeating pattern in the remaining cell areas from among the plurality of cell areas.

6. The viewing angle expansion plate of claim 1, wherein the plurality of pinholes are distributed in a basic hole distribution pattern.

7. The viewing angle expansion plate of claim 1, wherein each cell area from among the plurality of cell areas includes a respective group of pinholes from among the plurality of pinholes, and
wherein a predetermined number of pinholes from among the group of pinholes are positioned at a predetermined distance from a center of the respective cell area.

8. The viewing angle expansion plate of claim 1, wherein each cell area from among the plurality of cell areas includes a plurality of groups of pinholes from among the plurality of pinholes, wherein for each group of pinholes from among the plurality of groups of pinholes, each pinhole belonging to the respective group of pinholes is positioned at a respective distance from a center of the respective cell area, wherein the respective distance from the center of the respective cell area is different for each group of pinholes, and wherein a number of pinholes belonging to each group of pinholes follows a normal distribution with respect to the respective distance from the center of the respective cell area.

9. A flat panel display comprising:
a light source configured to emit parallel light;
a flat panel, on which the parallel light is incident, configured to provide a three-dimensional image; and
a viewing angle expansion plate of claim 1 configured to expand the viewing angle of the three-dimensional image.

10. The flat panel display of claim 9, wherein the flat panel comprises a liquid crystal display (LCD) panel configured to provide a holographic image.

11. The flat panel display of claim 9, wherein the light source comprises a meta lens.

12. The flat panel display of claim 9, wherein the light source comprises a lens comprising a turbid medium.

13. A method of operating a flat panel display, the flat panel display including:
a light source configured to emit parallel light;
a flat panel on which the parallel light is incident, the flat panel being configured to provide a three-dimensional image; and
a viewing angle expansion plate configured to expand the viewing angle of the three-dimensional image, the viewing angle expansion plate comprising:
a plurality of cell areas; and
a plurality of pinholes formed in the plurality of cell areas,
wherein each cell area from among the plurality of cell areas corresponds to a respective pixel from among a plurality of pixels in a flat panel display, and
wherein the plurality of cell areas comprises a first cell area in which a first number of pinholes are formed and a second cell area in which a second number of pinholes are formed, the second number being different from the first number,
the method comprising moving the viewing angle expansion plate during operation of the flat panel display.

14. The method of claim 13, wherein the moving of the viewing angle expansion plate comprises:
translating the viewing angle expansion plate in a plane parallel to the flat panel.

15. The method of claim 13, wherein the viewing angle expansion plate is tilted relative to the flat panel.

16. The method of claim 13, wherein the moving of the viewing angle expansion plate comprises:
rotating the viewing angle expansion plate relative to the flat panel.

17. The method of claim 16, wherein the viewing angle expansion plate includes a circular plate or a rectangular plate covering an entire surface of the flat panel on which an image is displayed.

18. The method of claim 13, wherein the moving of the viewing angle expansion plate comprises:
expanding the viewing angle expansion plate.

19. The method of claim 18, further comprising:
contracting the expanded viewing angle expansion plate to restore an original viewing angle expansion plate.

* * * * *